United States Patent
Goshen et al.

(10) Patent No.: US 8,089,989 B2
(45) Date of Patent: Jan. 3, 2012

(54) SYNCHRONIZATION OF NODES ON A NETWORK

(75) Inventors: Tomer Goshen, Afula (IL); Moshe M. Vered, Kiryat-Ono (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1006 days.

(21) Appl. No.: 11/987,360

(22) Filed: Nov. 29, 2007

(65) Prior Publication Data

US 2009/0141699 A1    Jun. 4, 2009

(51) Int. Cl.
*H04J 3/06* (2006.01)
(52) U.S. Cl. .................................. 370/503; 370/350
(58) Field of Classification Search .............. 370/350, 370/503, 508, 509, 510, 338, 337, 324
See application file for complete search history.

(56) References Cited

U.S. PATENT DOCUMENTS

| | | | |
|---|---|---|---|
| 6,199,169 B1 * | 3/2001 | Voth | 713/400 |
| 6,718,395 B1 | 4/2004 | Ziegler | |
| 7,151,945 B2 | 12/2006 | Myles et al. | |
| 7,180,915 B2 | 2/2007 | Beyer et al. | |
| 2002/0136198 A1 * | 9/2002 | Findikli | 370/350 |
| 2004/0223484 A1 | 11/2004 | Xia et al. | |
| 2010/0001770 A1 * | 1/2010 | Bogenberger et al. | 327/144 |

FOREIGN PATENT DOCUMENTS

| KR | 4056474 | 7/2004 |
|---|---|---|
| WO | WO 2005/029777 | 3/2005 |

* cited by examiner

*Primary Examiner* — Huy Vu
*Assistant Examiner* — Dady Chery

(57) ABSTRACT

A method for synchronizing at least two nodes on a network including one network node acting as a master node, the master node setting a base time $T_{0,master}$, and sending elapsed time since $T_{0,master}$ to at least one other node acting as a slave node, and the at least one other node acting as the slave node receiving the elapsed time, and estimating and setting a value of a base time $T_{0,slave}$ based, at least partly, on the received elapsed time. Related apparatus and methods are also described.

31 Claims, 4 Drawing Sheets

SYNCHRONIZATION OF NODES ON A NETWORK

FIELD OF THE INVENTION

The present invention relates to a method for synchronizing nodes in a network, and more particularly, but not exclusively, to synchronizing nodes in a network with a synchronization accuracy better than the network latency. Still more particularly, and not exclusively, to synchronizing two or more nodes using a Bluetooth connection.

BACKGROUND OF THE INVENTION

The IEEE 802.11 standard describes a Time Synchronization Function (TSF), which allows stations to update their clocks. The stations only update clocks forward, not backward.

U.S. Pat. No. 6,718,395 to Ziegler describes a method and apparatus for synchronizing with communication traffic in a Bluetooth network without joining the network. The apparatus transmits an inquiry signal and receives an inquiry response signal having a coarse system clock time. The apparatus uses the coarse system clock time for estimating an initial channel in a channel hopping sequence then advances channels through the sequence in steps of four or more for scan window time periods of four or more time slot periods until a communication traffic signal is recognized. The time-of-arrival of the traffic signal is used for refining the coarse system clock time in order to acquire the exact system clock time. The exact system clock time is used by the analyzer for deriving the channels and timing of the sequence for synchronizing to subsequent communication traffic signals.

KR patent 4,056,474 to Electronics and Telecommunications Research Institute describes a method for synchronizing two or more devices by setting a common clock using a UTC (Universal Time Clock). The UTC is obtained through another device such as a GPS (Global Position System).

U.S. Pat. No. 7,151,945 to Myles et al. describes a method and apparatus for synchronizing a local clock value in a wireless receiver receiving a data unit containing synchronization information. The method includes receiving a first data unit containing synchronization information, extracting the synchronization information from the received first data unit, copying a local free-running clock at a known reference point in time relative to the time the first data unit was received to generate a local timestamp; and calculating an offset to the free-running clock using the extracted synchronization information and the local timestamp, the calculating in non real-time, such that the sum of the calculated offset and the value of the free-running clock provides a local clock value that is approximately synchronized in time. The apparatus implementing the method is part of a node of a wireless station, and provides a time synchronization function, typically at the MAC layer.

Additional background art includes:

U.S. Pat. No. 7,180,915 to Beyer et al.;

Published US Patent Application 2004/0223484 of Xia et al; and

Published PCT Patent Application WO 2005/029777 of Koninklikje Philips Electronics, N.V.

The disclosures of all references mentioned above and throughout the present specification, as well as the disclosures of all references mentioned in those references, are hereby incorporated herein by reference.

SUMMARY OF THE INVENTION

The present invention, in some embodiments thereof, seeks to provide a method for synchronizing nodes in a network, with synchronization accuracy better than the network latency. More particularly, but not exclusively, to provide an improved method for synchronizing two or more nodes using a Bluetooth connection.

An aspect of the method provides for synchronizing between a master network node, and other nodes. The master network node is a node according to whose clock the other nodes will synchronize.

The term master network node is meant only for purpose of synchronizing between nodes. In fact, a master network node can be a slave, for purpose of a synchronizing happening at some other time, and can be a slave for purpose of a synchronizing happening at the same time for another purpose, such as synchronizing a different group of nodes.

It is likely, but not necessary, that a master node according to one meaning of the term will be chosen as the master network node for synchronization according to the meaning in the present specification and claims.

As used herein, the term network is only meant to imply two or more network nodes, two or more devices, or even two or more processes within a device, which synchronize to each other by using inter node, inter device, or inter process communications. By way of some non-limiting examples, the term network may mean a wired network; a wireless network; a point-to-point wireless connection; a cellular network; inter process communication; communication between two or more CPUs on a chip, and so on.

As used herein, the term node is used for describing a unit which is being synchronized with another unit. As mentioned above, a node can synchronize to another node, a device can synchronize to another device, and a process can synchronize to another process.

To synchronize between two or more devices on a network, or network nodes, an arbitrary base time is set, which is common to the devices. Once such a common base time is established, one device can request another device to perform a task with reference to a delay from the base time.

The synchronization to a common base time is especially useful when a timed task needs to be performed by several devices in a network practically simultaneously. The devices can start a task simultaneously, since each of the devices can calculate when to start the task. A non-limiting example of a need for synchronization is a case of playing a game between devices connected by a Bluetooth network, such as a Rhythm Game.

A Rhythm Game, which is a music video game, also commonly known as a music game, is a video game where the game play is oriented around the player's ability to follow a musical beat and stay with the rhythm of the game's soundtrack. In the music video game, the player must press specific buttons, or activate controls on a specialized game controller, in time with the game's music.

Since the player must focus on the game's sound, playing the game over a network, whether wired or wireless, requires synchronicity.

In many cases where human reaction is involved, synchronization accuracy between devices should be on an order of 50 milliseconds. In other cases accuracy needs to be on an order of a few milliseconds.

Network connections, such as, for example, Bluetooth connections, have an unknown latency, which changes over time as relative positions of the connected devices change. Thus, a lowest possible latency can be known for the connections and not actual network latency at run time.

It is expected that during the life of this patent Bluetooth technology will evolve and latency of Bluetooth connection will change. The Bluetooth examples provided herein are illustrative only and not intended to be limiting.

An aspect of the present invention uses the variance of network latency over time to gradually improve synchronization between the master network node and the slave network nodes. The slave network nodes set a local version of the common base time. Due to the variance of network latency, each time the slave network nodes receive an opportunity to synchronize with the master network node's base time, the slave nodes do so, if the new synchronization is more accurate than the old, as will be described below.

The term "master network node" in all its forms is used throughout the present specification and claims interchangeably with the term "master node" and its corresponding forms, and with the term "master" and its corresponding forms. The term "slave network node" in all its forms is used throughout the present specification and claims interchangeably with the term "slave node" and its corresponding forms, and with the term "slave" and its corresponding forms.

The master node defines some time as a master base time, the time of a beginning of a timeline. The master node measures the time elapsed since the master base time, and sends the elapsed time to a slave node in the network.

The slave node has its own internal clock, and when the slave node receives the elapsed time, it subtracts the elapsed time and a fixed estimate of system latency from its own clock time, thereby producing its own first estimate of a local, slave, base time. The slave base time is now approximately equal to the master base time.

The master node calculates a new elapsed time value, and sends the new elapsed time value to the slave node, repeating the calculation and subsequent sending for several more times. Each time the slave node receives the new elapsed time, it produces a new value for the slave base time, by subtracting each new elapsed time value, and system latency, from its own clock.

If the new value of the slave base time is prior to the old value of the slave base time, the slave node replaces the old value of the slave base time with the new value of slave base time.

After a few rounds of such calculations, the slave base time enjoys a benefit of having a smallest discrepancy from the master base time.

Reference is now made to the following example, which together with the descriptions herein, illustrates some embodiments of the invention in a non limiting fashion. In a Bluetooth network using an embodiment of the present invention, the Bluetooth network latency, measured under laboratory conditions was 5 milliseconds. The 5 millisecond value was used as the system latency.

Following a setting of the system latency, the synchronization method was used to synchronize the Bluetooth network. The master sent elapsed time measurements 40 times to the slave, at intervals of 50 milliseconds between each sending. The period of time for synchronizing was therefore 40*50 milliseconds, which is 2 seconds. While the actual Bluetooth network latency varied from a maximum of 40 milliseconds to a minimum of 5 milliseconds, the network was synchronized at an accuracy of less than 1 millisecond.

It is to be appreciated that once synchronization is achieved by the network nodes, how long the nodes remain in synchronization depends on accuracy of the nodes' local clocks. By way of a non-limiting example, for the purpose described above of a Rhythm game over a Bluetooth network, the nodes remain synchronized for far longer than a Rhythm game is expected to last.

Network nodes participating in the synchronization described above can participate in more than one such synchronization at any one time. A network node can be a master node for one or more groups of nodes, and a slave node for one or more other groups of nodes. In other words, the network node can have more than one base time as master, and more than one base time as slave, thereby synchronizing itself with different groups of nodes for different purposes.

According to an aspect of some embodiments of the present invention there is provided a method for synchronizing at least two nodes on a network including one network node acting as a master node, the master node setting a base time $T_{0,master}$, and sending elapsed time since $T_{0,master}$ to at least one other node acting as a slave node, and the at least one other node acting as the slave node receiving the elapsed time, and estimating and setting a value of a base time $T_{0,slave}$ based, at least partly, on the received elapsed time.

According to some embodiments of the invention, the estimating is performed by subtracting the received elapsed time and a predetermined system latency from a local clock time.

According to some embodiments of the invention, the sending elapsed time is performed more than once, and the slave node performs the receiving and the estimating more than once, and the slave node performs the setting a value of a base time $T_{0,slave}$ if the estimate provides better synchronization with the master node.

According to some embodiments of the invention, the nodes on the network include processes configured to communicate with each other. According to some embodiments of the invention, the nodes on the network include devices configured to communicate with each other using Bluetooth communications.

According to some embodiments of the invention, after synchronization the base time $T_{0,master}$ and the base time $T_{0,slave}$ are within less than 1 millisecond of each other.

According to some embodiments of the invention, the slave node includes a first slave node, and the first slave node performs synchronization and acts as the master node for a second slave node which is on a network with the first slave node.

According to some embodiments of the invention, setting the base time $T_{0,master}$ includes calculating a statistical value of base times polled from more than one node, and setting the statistic value to be the base time $T_{0,master}$. According to some embodiments of the invention, the statistical value is an average.

According to some embodiments of the invention, the following is performed iteratively the master node sending a new elapsed time since the $T_{0,master}$, the slave node receiving the new elapsed time, the slave node producing a new estimate for each received new elapsed time, and the slave node updating the value of the base time $T_{0,slave}$ if the new estimate is prior to the base time $T_{0,slave}$ which is already set.

According to some embodiments of the invention, the master node sets more than one base time $T_{0,master}$, and sends the elapsed time per more than one of the base times $T_{0,master}$.

According to some embodiments of the invention, the network is a wireless network. According to some embodiments of the invention, the network is a direct wireless network. According to some embodiments of the invention, the network is a Bluetooth network.

According to some embodiments of the invention, the predetermined system latency includes a measurement of network latency. According to some embodiments of the invention, the predetermined system latency also includes a measurement of time taken by the master node to calculate and send the elapsed time, and the time taken by the slave node to receive and calculate $T_{0,slave}$.

According to an aspect of some embodiments of the present invention there is provided a method for a slave node to synchronize to a master node, including receiving an elapsed time since a master base time $T_{0,master}$ sent by the master node, estimating and setting a value of a base time $T_{0,slave}$ based, at least partly, on the received elapsed time.

According to some embodiments of the invention, the slave node receives more than one elapsed time, the slave node performs the receiving and the estimating for each received elapsed time, and the slave node updates the base time $T_{0,slave}$ whenever the estimating produces a base time prior to the $T_{0,slave}$ which is already set.

According to some embodiments of the invention, the slave node receives more than one elapsed time since base time $T_{0,master}$, referencing more than one base time $T_{0,master}$, and sets more than one $T_{0,slave}$ corresponding to the more than one base times $T_{0,master}$.

According to some embodiments of the invention, the estimating is performed by subtracting the received elapsed time and a predetermined system latency from a local clock time.

According to an aspect of some embodiments of the present invention there is provided a method for a master node to provide synchronization to a slave node including setting a base time $T_{0,master}$, and sending an elapsed time since $T_{0,master}$ to the slave node.

According to some embodiments of the invention, the master node sets more than one base time $T_{0,master}$, and sends the elapsed time per more than one of the base times $T_{0,master}$.

According to an aspect of some embodiments of the present invention there is provided a method for synchronizing at least two nodes on a network, in which each of the nodes includes a local clock, including one network node acting as a master node and sending synchronization data, based at least in part on its local clock, to at least one other node acting as a slave node, the at least one other node acting as a slave node, receiving the synchronization data, and synchronizing with the master node, based, at least in part, on its local clock and the synchronization data, and the master node repeating the sending and the slave node repeating the receiving and synchronizing.

According to some embodiments of the invention, the number of repetitions is greater than 2.

According to some embodiments of the invention, the master node repeats the sending and the slave node repeats the receiving and synchronizing until the master node and the slave node are synchronized to within less than a predetermined value.

According to some embodiments of the invention, the slave node is synchronized to the master node to within one millisecond.

According to some embodiments of the invention, the slave node also sends synchronization data to the master node, and the master node determines when the master node and the slave node are synchronized to within less than a predetermined value, based, at least in part, on the synchronization data sent by the slave to the master.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF EMBODIMENTS OF THE INVENTION

Figure 1:
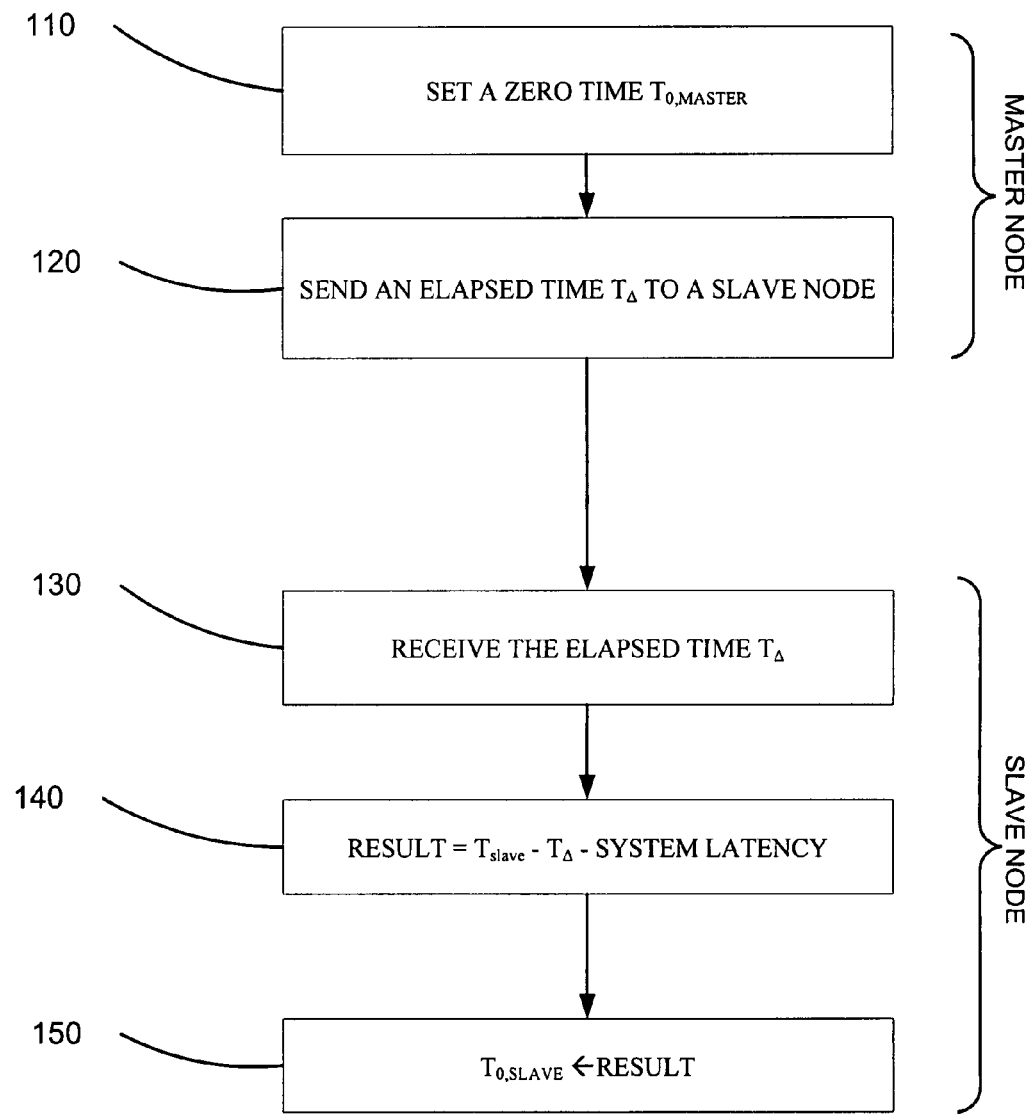
FIG. 1 is a simplified flow diagram of a method of network node synchronization according to a preferred embodiment of the present invention.

The present invention, in some embodiments thereof, relates to a method for synchronizing nodes in a network, and more particularly, but not exclusively, to synchronizing nodes in a network with a synchronization accuracy better than the network latency. Still more particularly, and not exclusively, to synchronizing two or more nodes using a Bluetooth connection.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The method described in above-mentioned U.S. Pat. No. 6,718,395 to Ziegler is complex to implement. The method requires working with lower levels of the Bluetooth standard. This complicates maintenance of the method and complicates porting the method to different devices.

Disadvantages of the above-mentioned method of KR patent 4,056,474 are a dependency on an additional device, such as a GPS receiver, and relying on an external clock which might not be available in some cases. For example, in case of a GPS, reception is often unavailable indoors.

The master node defines some time $T_{0,master}$ as base time, the time of a beginning of a timeline. The master node measures the time elapsed since $T_{0,master}$, and sends the elapsed time $T_A$ to a slave node in the network.

The slave node has its own internal clock, and when the slave node receives $T_A$, it subtracts $T_A$ and a fixed estimate of system latency from its own clock time $T_{slave}$, thereby producing its own first estimate of $T_{0,slave}$. $T_{0,slave}$ is now approximately equal to $T_{0,master}$.

The master node calculates a new $T'_A$ value, and sends the new $T'_A$ value to the slave node, repeating the calculation and subsequent sending for several more times. Each time the slave node receives $T'_A$, it produces a new value for $T_{0,slave}$, termed herein $T'_{0,slave}$, by subtracting each new $T'_A$ value and system latency from its own clock.

If $T'_{0,slave}$ is prior to $T_{0,slave}$, the slave node replaces the value $T_{0,slave}$ with the value $T'_{0,slave}$.

After a few rounds of such calculations, $T'_{0,slave}$ enjoys a benefit of having a smallest discrepancy from $T_{0,master}$.

A typical accuracy achieved by embodiments of the present invention using a Bluetooth network is lower than one millisecond.

Some terms used in the present specification and claims are hereby described.

A High Resolution Clock is a clock present at the network nodes. The time resolution of the High Resolution Clock is better than required synchronization accuracy. Such clocks are not hard to come by, since many clocks offer resolution much better than network latencies, and required synchronization accuracies are often better than network latencies. The High Resolution Clock value may or may not initialize, that is, be reset to zero, upon device startup. The synchronization method described herein, in some embodiments thereof, does not depend on the High Resolution Clock resetting to zero upon device startup.

A base time, termed herein $T_o$ ($T_{0,master}$ and $T_{0,slave}$) is an arbitrary time common to devices belonging to a synchronized group of devices, which the synchronized devices refer to as a beginning of a timeline.

A synchronization process is a process in which a master device and a slave device cooperate in setting a common base or other common time.

A master device is a device which sets the common clock. Slave devices are synchronized with the master device, therefore the slave devices are synchronized with each other as well.

A slave device is a device which participates in the synchronization process and is not the master device. There can be any number of slave devices being synchronized with a master device.

In some embodiments of the present invention, a device may be a slave device synchronized by an original master device, then be a master device in a hierarchy for synchronizing other slave devices to the original master device.

A system latency is a minimum network latency which is expected and/or measured to exist in a network. The minimum network latency, which can be, for example, measured in milliseconds, is a minimum time it takes for a packet to be sent from one network device to another. The minimum time is calculated by statistics of measured network latencies, and/or by measurements made in a laboratory.

Embodiments of the present invention provide devices on a network with a value of a predetermined system latency.

In some embodiments of the present invention, the time it takes the master node to calculate $T_A$, and the time it takes the slave node to calculate $T_{0,slave}$ are also measured in a laboratory setting, under good conditions. In case of some synchronization settings, when the processes of calculating $T_A$ at the master, and calculating $T_{0,slave}$ at the slave are on a same order of magnitude as the network latency, fixed estimates of the above-mentioned times are also used by a slave as part of system latency in order to improve accuracy of synchronization.

Some embodiments of the present invention calculate system latency based on average typical network conditions; some embodiments of the present invention calculate system latency based on best actual network conditions; some embodiments of the present invention calculate system latency based on laboratory network conditions; and so on.

An accuracy of the synchronization method described herein is usually better than network latency. If, for example, the network latency is always fixed, being the same in the laboratory and in actual practice, then $T_{0,slave}$ and $T_{0,master}$ can be equal. In any case, the accuracy, or difference between $T_{0,slave}$ and $T_{0,master}$, is better than any single calculation of $T_{0,slave}$ which would be made if system latency were not taken into account.

The synchronization process will now be described in more detail.

The synchronization process is optionally initiated either by a network node acting as a master or by a network node acting as a slave and sending a request to the master for the synchronization process to begin.

Reference is now made to FIG. 1, which is a simplified flow diagram of a method of network node synchronization according to a preferred embodiment of the present invention.

A network node which is to be a master in the synchronization process sets some arbitrary time as a base time $T_{0,master}$ (110). This action can happen at any time up to a beginning of the synchronization process.

The master calculates an elapsed time $T_A$ since $T_{0,master}$, and sends the $T_A$ to a slave (120).

The slave receives the elapsed time $T_A$ (130).

The slave subtracts the elapsed time $T_A$ and a system latency from its local high resolution clock time $T_{slave}$, thereby producing a result (140), which is a first estimate of base time. The first estimate may be enough for synchronization, or may not be enough. The subject of when to stop synchronization will be further described below, with reference to FIG. 2.

In some embodiments of the present invention, the system latency is comprised of the laboratory network latency.

In some embodiments of the present invention, the laboratory network latency is comprised of a minimum network latency.

In other embodiments of the present invention, the system latency is comprised of the laboratory network latency, plus a fixed estimate of the time it took the master node to calculate $T_A$, plus a fixed estimate of the time it took the slave node to calculate $T_{0,slave}$.

Finally the slave sets its own base time, $T_{0,slave}$, to be equal to the result (150).

In some embodiments of the present invention, the process of synchronization continues iteratively, performing acts described in references 120 to 150 of FIG. 1 several more times, with the following caveat, that the slave updates the value of base time $T_{0,slave}$ only if the result is prior to the $T_{0,slave}$ which is already set.

In some embodiments of the present invention, the slave receives several values of the elapsed time $T_A$ from the master, and subtracts the values of the elapsed time $T_A$ from its local clock, thereby producing several estimations of $T_{0,slave}$. The slave uses the several values to estimate a value of $T_{0,slave}$ which is closer to $T_{0,master}$, than even the earliest $T_{0,slave}$. The slave comprises a model of the statistical variance of the network latency. The variance of the several estimations of $T_{0,slave}$, corresponds to the variance of the network latency. The slave estimates a value for a minimum network latency based on the sampled variance of the network latency, without actually receiving an elapsed time which was received from the master after a minimum network latency.

In some embodiments of the present invention the master synchronizes more than one slave. The master can send elapsed times to more than one slave at a time, using suitable methods. The suitable methods include, by way of a non-limiting example, broadcasting to all the slaves; sending separately to each of the slaves; broadcasting to some slaves and sending separately to some slaves; synchronizing each slave sequentially, completing one after the other; and various combinations of the above.

In some embodiments of the present invention one network node acts as a master for more than one group of nodes. The master can set more than one $T_{0,master}$, and sends elapsed times from each of the $T_{0,master}$ values to nodes corresponding to the more than one group of nodes, thereby synchronizing the more than one group of nodes to different $T_{0,master}$ values.

In some embodiments of the present invention, the master sets a base time based on polling base times from other nodes on the network. By way of a non-limiting example, when the nodes on the network already have local values of internal clocks, the master node polls the nodes for their local clock values, averages the local clock values and uses the average to set the $T_{0,master}$ value.

In some embodiments of the present invention the master node uses a different statistical value of the local clock values. By way of a non-limiting example, the different statistical value is a minimum of the local clock values; a maximum of the local clock values; a median of the local clock values; and so on.

Figure 2:
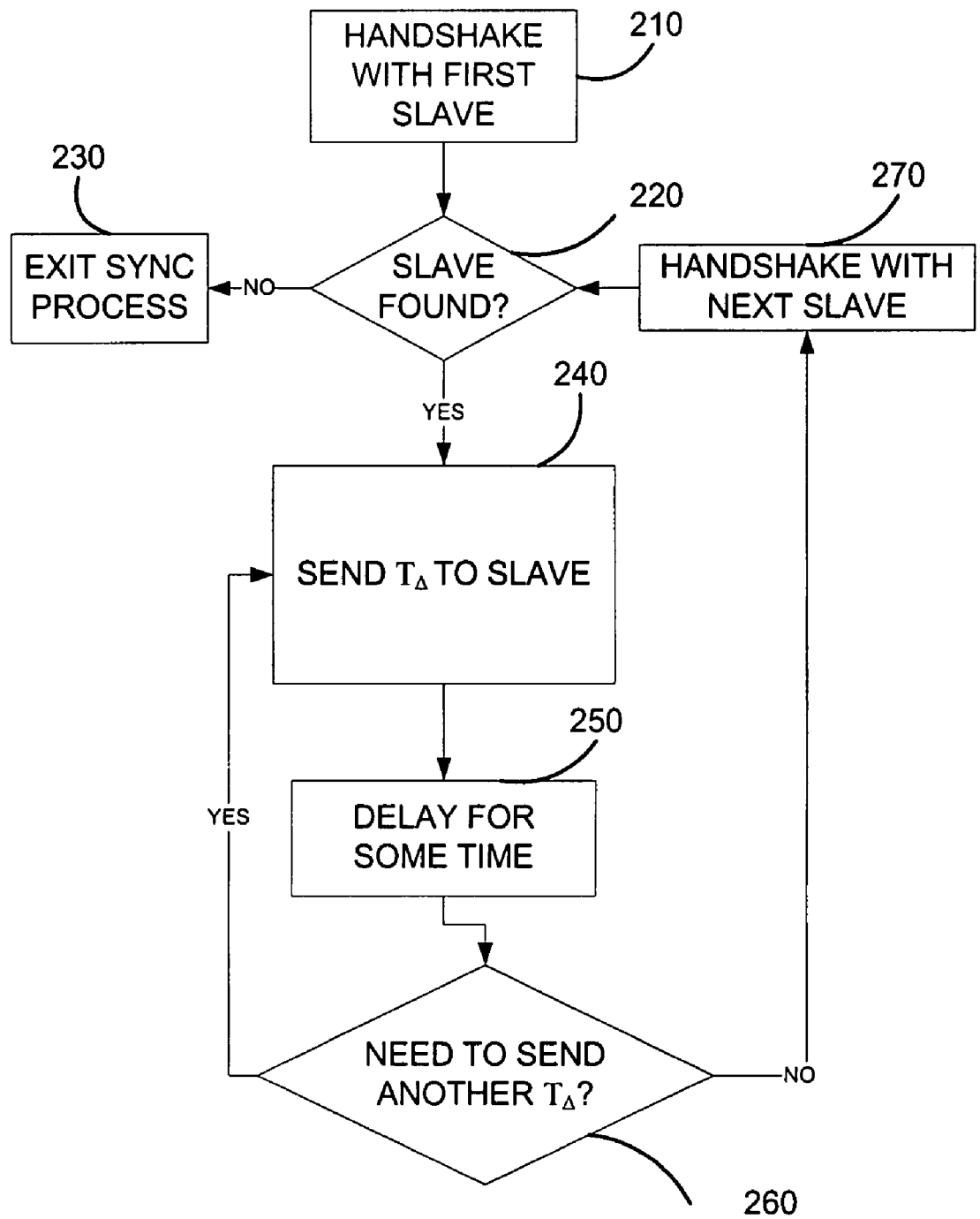
FIG. 2 is a more detailed flow diagram of a synchronization process at a master network node, according to an exemplary embodiment of the method of FIG. 1.

Reference is now made to FIG. 2, which is a more detailed flow diagram of a synchronization process at a master network node, according to an exemplary embodiment of the method of FIG. 1.

The master starts the synchronization process by sending a handshake message to a first slave (210).

If the slave responds to the handshake (220), then the slave is ready for the synchronization process, and the master continues the synchronization process (240). If no slave responds to the handshake, then there is no slave to synchronize with, and the master exits the synchronization process (230).

The master continues the synchronization process, and sends an elapsed time $T_A$ since $T_{0,master}$ to the slave (240).

The master then delays for some time (250), after which the master checks whether there is a need to send data with another $T_A$ to the slave (260).

The time of delay (250) is determined by the type of network and by quality of communications between master and slave. The delay is intended to allow the slave time to process the received $T_A$, and in order not to clutter the network, which may be used for additional purposes.

If the master determines that there is a need to send another packet with $T_A$ to the slave, then the master sends another packet with $T_A$ to the slave (240), and repeats the process of 240 to 260. If not, the master proceeds to send a handshake message to another slave (270).

In some embodiments of the present invention the handshake message is comprised in a special purpose communication. In other embodiments of the present invention the handshake is part of normal communication between the master and the slave.

Different embodiments of the present invention comprise different methods of discovering whether there is a need to send another packet with $T_A$ to the slave.

In one embodiment of the present invention the master sends a fixed number of packets with $T_A$ to the slave, after which the process of synchronizing the slave ends. The fixed number is a suitable number programmed into the master, based on knowledge of the network. Just as the system latency is determined externally of the synchronization process, so is the suitable fixed number determined externally of the synchronization process. By way of a non-limiting example, the fixed number is based on measuring network latencies, and determining how many transmissions are required in order to include, with a desired degree of certainty, a network latency substantially close to laboratory latency.

In another embodiment of the present invention the master sends a number of packets with $T_A$ to the slave, for a fixed period of time, after which the process of synchronizing the slave ends. The fixed period of time is a suitable period of time programmed into the master, based on knowledge of the network. Just as the system latency is determined externally of the synchronization process, so is the suitable fixed period of time determined externally of the synchronization process. By way of example, the fixed period of time is determined according to what period of time is considered reasonable to spend for synchronizing.

In another embodiment of the present invention the master relies on an indication from the slave that synchronization is complete. How the slave determines that synchronization is complete is described in more detail below, with reference to FIG. 2.

In yet another embodiment of the present invention the master relies on the slave sending its own $T_A$, measured from $T_{0,slave}$, and decides when to terminate the synchronization based on a result of using the received $T_A$ to compare $T_{0,slave}$ to $T_{0,master}$. By way of a non-limiting example, the master calculates the slave's $T_{0,slave}$ by subtracting the received $T_A$ and the fixed system latency from the master clock time, thereby determining an estimate of $T_{0,slave}$. If the estimate of $T_{0,slave}$ is close enough to $T_{0,master}$, the master terminates the synchronization.

When a master is providing synchronization to more than one slave in parallel, and the method of ending synchronization is based upon notification by the slaves that synchronization has ended, the master preferably stops the synchronization after receiving end of synchronization notifications from all the slaves participating in synchronization. In some embodiments of the present invention, if the master does not receive end of synchronization notifications from all the slaves participating in synchronization by a suitable time, the master stops the synchronization anyway, in order not to wait on a problematic slave.

A master may provide synchronization to several slaves in parallel, using a broadcast transmission mode, or alternatively, may provide synchronization to one slave at a time, in one to one transmission mode.

The master may be master for more than one synchronized group of nodes. The master can synchronize a first group of nodes using one $T_{0,master}$, and a second group of nodes using a second $T_{0,master}$. In fact, the master can also be a slave in a third group of nodes.

Figure 3:
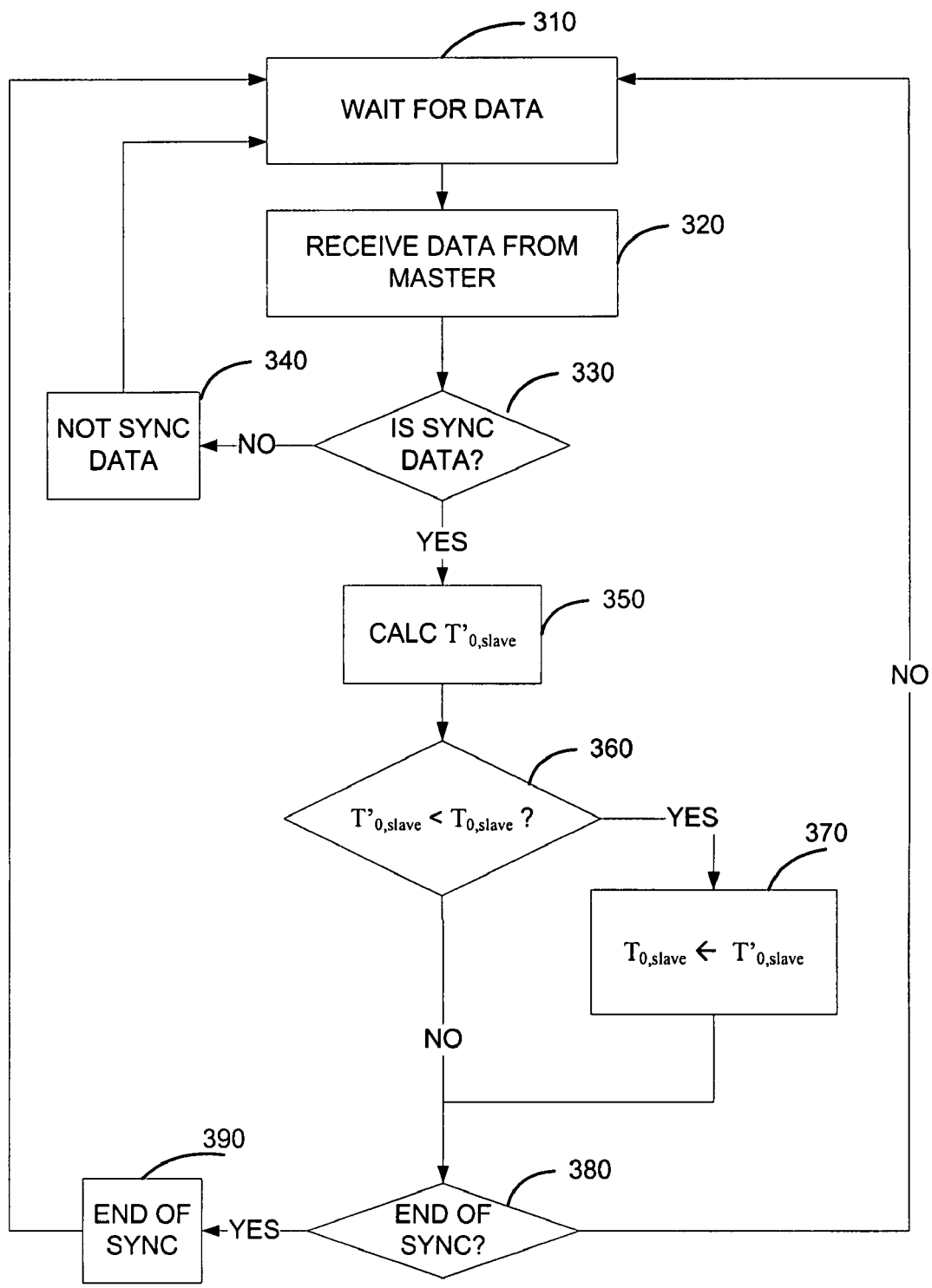
FIG. 3 is a more detailed flow diagram of a synchronization process at a slave network node, according to an exemplary embodiment of the method of FIG. 1.

Reference is now made to FIG. 3, which is a more detailed flow diagram of a synchronization process at a slave network node, according to an exemplary embodiment of the method of FIG. 1.

In cases where the master and the slave require synchronization, there is one way or two way communication between the master and the slave. At least the slave, at a certain point in time, is waiting for data (310).

When the slave receives data from the master (320), the slave checks whether the data contains synchronization data, that is, whether the data comprises a $T_A$ value (330).

If the data does not contain synchronization data, the slave takes whatever action is relevant (340), and typically returns to waiting for data (310).

If the data contains synchronization data, the slave calculates a new base time $T'_{0,slave}$ (350). The slave calculates a new base time by subtracting $T_A$ and system latency from its own clock time $T_{0,slave}$.

The slave next compares the new base time $T'_{0,slave}$ to a saved base time $T_{0,slave}$, checking whether the new base time $T'_{0,slave}$ is prior to the saved base time $T_{0,slave}$ (360).

If the new base time $T'_{0,slave}$ is prior to the saved base time $T_{0,slave}$, the slave saves the new base time $T'_{0,slave}$ as a new saved base time $T_{0,slave}$ (370).

If the new base time $T'_{0,slave}$ is not prior to the saved base time $T_{0,slave}$, the slave does not change the value of the saved base time $T_{0,slave}$.

If there is no saved base time $T_{0,slave}$ for the present synchronization session, a case which would happen for example at a beginning of synchronization, the slave simply saves the new base time $T'_{0,slave}$ as the saved base time $T_{0,slave}$ (370).

In some embodiments of the present invention the slave does not save the new base time $T'_{0,slave}$ as a new saved base time $T_{0,slave}$ (370) until a later iteration (not shown in FIG. 3) enables the slave to calculate a second new base time $T''_{0,slave}$ which is as early as the first new base time $T'_{0,slave}$.

The slave next checks if the synchronization process has ended (380). How the slave checks if the synchronization process has ended is described in more detail below. If the synchronization process has indeed ended (390), the slave typically returns to waiting for data (310). If the synchronization process has not ended, the slave typically returns to waiting for data (310), expecting to receive more synchronization data.

In some embodiments of the present invention the master and the slave can proceed, after a first synchronization, to work as if synchronized, while in parallel continuing the synchronization process.

In other embodiments of the present invention the master and the slave wait for the synchronization process to end before proceeding to perform work requiring synchronization.

The synchronization process can thus repeat for more than one turn of receiving $T_A$, gradually increasing the accuracy of the synchronization.

The value of $T'_{0,slave}$ is prior to, that is earlier than, $T_{0,slave}$ when the network latency is smaller than the network latency was when $T_{0,slave}$ was calculated. When the value of $T'_{0,slave}$ is earlier, $T'_{0,slave}$ replaces $T_{0,slave}$. When the value of $T'_{0,slave}$ is later, $T'_{0,slave}$ does not replace $T_{0,slave}$. The calculation of $T_{0,slave}$ is performed by:

$$T_{0,slave} = T_{slave} - T_A - \text{system latency} \qquad \text{(Equation 1)}$$

while the precise value of $T_{0,slave}$ should be:

$$T_{0,slave} = T_{slave} - T_A - \text{Actual network latency} \qquad \text{(Equation 2)}$$

The inaccuracy of the synchronization of one such calculation is as great as the difference between the system latency and the network latency of the actual transmission of the $T_A$ used in the calculation. The repeated settings of $T_{0,slave}$ use a smallest value of the actual network latency, which is nearest to the system latency calculated under laboratory conditions.

In some embodiments of the present invention, the slave receives elapsed times referencing more than one $T_{0,master}$, from either one master or from more than one master. The slave performs synchronization corresponding to each $T_{0,master}$ separately, arriving at separate values of $T_{0,slave}$.

In some embodiments of the present invention, a fixed estimate of the time used by the master node to calculate $T_A$, and a fixed estimate of the time used by the slave node to calculate $T_{0,slave}$, are also used as part of the system latency value in Equation 1.

In some embodiments of the present invention, the slave determines if the synchronization process has ended, while in other embodiments it is the master which determines.

In some embodiments of the present invention, the slave determines if the synchronization process has ended by counting the number of different $T_A$ received from the master, and sending the master an indication when a suitable number has been received.

In other embodiments of the present invention, the slave determines if the synchronization process has ended by counting the number of times T0,slave has been updated, which means improved in accuracy, and sending the master an indication when a suitable number of improvements has been achieved.

In yet other embodiments of the present invention, the slave determines if the synchronization process has ended by calculating a statistic, such as, by way of a non-limiting example, an average, of the last N improvements in accuracy. When the statistic is below a suitable threshold, the slave sends the master an indication when the synchronization process, as far as the slave is concerned, has ended.

In still other embodiments of the present invention, the slave determines if the synchronization process has ended and does not send the master an indication that the synchronization process, as far as the slave is concerned, has ended.

Figure 4:
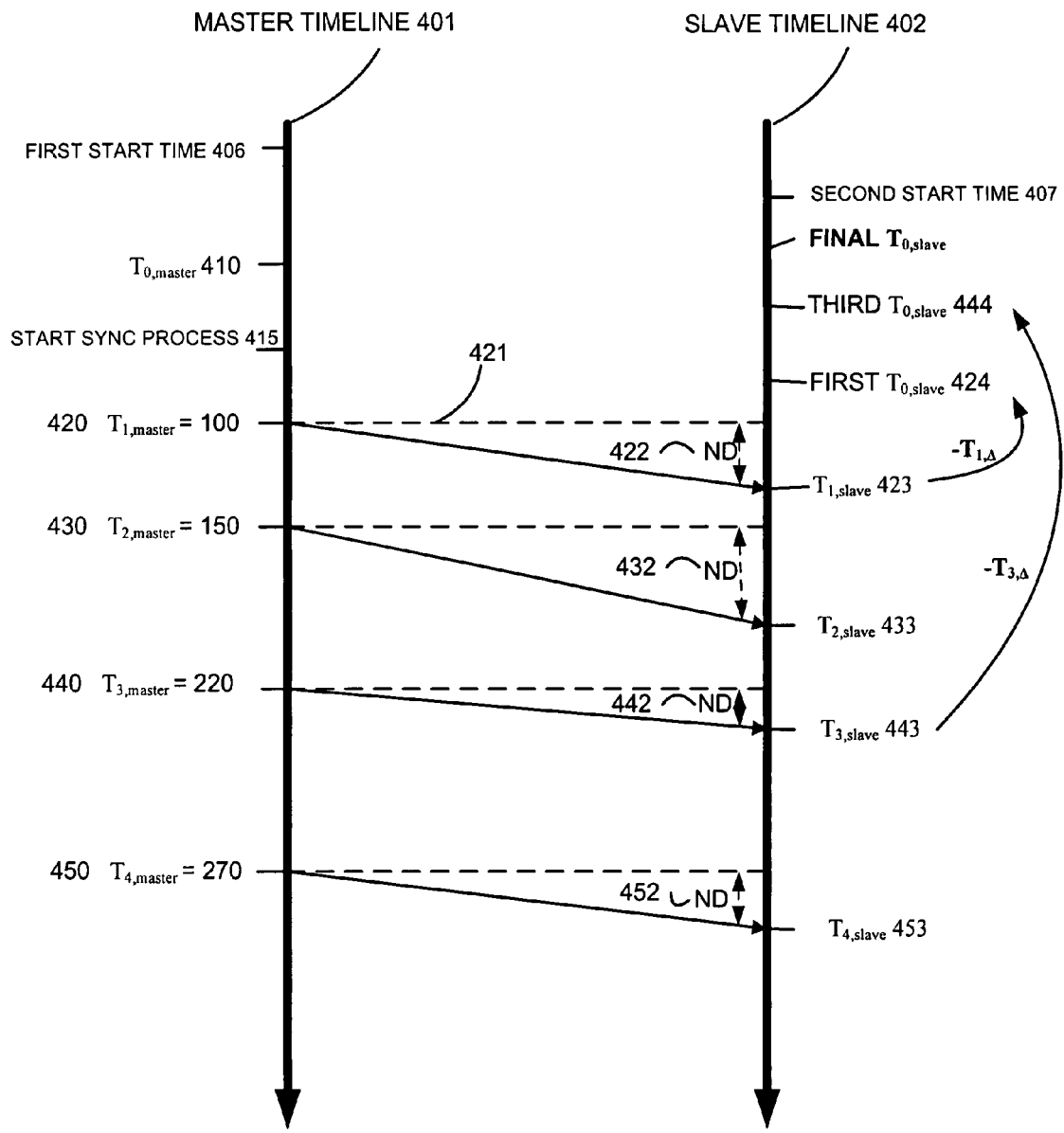
FIG. 4 is a simplified pictorial diagram of two timelines, at a master network node and at a slave network node, during repetitions of the method of FIG. 1.

Reference is now made to FIG. 4, which is a simplified pictorial diagram of two timelines, at a master network node and at a slave network node, during repetitions of the method of FIG. 1.

A left vertical line is a master timeline 401, with time increasing from top to bottom. A right vertical line is a slave timeline 402, with time increasing from top to bottom.

The master has started measuring time at a first start time 406, while the slave has started measuring time at a second start time 407, not necessarily equal to the first start time 406.

The master sets a base time $T_{0,master}$ 410, and some time later starts a synchronization process 415, intended to provide a slave with a synchronized base time $T_{0,slave}$.

At time $T_{1,master}$ 420, the master performs a first calculation of $T_{1,A}$, which is an elapsed time since $T_{0,master}$ 410. By way of a non-limiting example, $T_{1,master}$ 420 is equal to 100 milliseconds after the base time $T_{0,master}$ 410. The master sends the value of $T_{1,A}$ to the slave. Dotted line 421 is drawn from the master time line 401 to the slave timeline 402, to show when, on the slave timeline 402, the $T_{1,\Delta}$ was sent from the master. The slave receives $T_{1,\Delta}$ some time later than it was sent, the difference in time being a Network Delay (ND) 422. When the slave receives the $T_{1,\Delta}$ the slave calculates a first approximation of $T_{0,slave}$ 424 by subtracting $T_{1,\Delta}$ from the slave local time $T_{1,slave}$ 423. The result of the calculation, which is the first approximation of base time by the slave, is depicted as $T_{0,slave}$ 424 on the slave timeline 402.

At time $T_{2,\Delta}$ 430, by way of a non-limiting example 150 milliseconds after $T_{0,master}$ 410, the master performs a second calculation of $T_\Delta$, and sends the value of $T_{2,\Delta}$ to the slave. The slave receives $T_{2,\Delta}$ some time later than it was sent, the difference in time being a second Network Delay (ND) 432. When the slave receives the $T_{2,\Delta}$, the slave calculates a second approximation of $T_{0,slave}$ (not shown) by subtracting $T_{2,\Delta}$ from the slave local time $T_{2,slave}$ 433. In case of the example depicted in FIG. 4, the second Network Delay (ND) 432 is larger than the first Network Delay (ND) 422, therefore the second approximation of $T_{0,slave}$ (not shown) is not prior to the first approximation of $T_{0,slave}$, and the first approximation of $T_{0,slave}$ 424 is not replaced. The first approximation of $T_{0,slave}$ 424 is not replaced since it is a result of a communication with a shorter network latency, which is closer to the system latency used as a constant, and therefore more accurate.

At time $T_{3,\Delta}$ 440, by way of a non-limiting 220 milliseconds after $T_{0,master}$ 410, the master performs a third calculation of $T_\Delta$, and sends the value of $T_{3,\Delta}$ to the slave. The slave receives $T_{3,\Delta}$ some time later than it was sent, the difference in time being a third Network Delay (ND) 442. When the slave receives the $T_{3,\Delta}$, the slave calculates a third approximation of $T_{0,slave}$ by subtracting $T_{3,\Delta}$ from the slave local time $T_{3,slave}$ 443. In case of the example depicted in FIG. 4, third Network Delay (ND) 442 is smaller than the first Network Delay (ND) 422, therefore the third approximation of $T_{0,slave}$ 444 is prior to the first approximation of $T_{0,slave}$ 424, and the first approximation of $T_{0,slave}$ 424 is replaced by the third approximation of $T_{0,slave}$ 444.

At time $T_{4,\Delta}$ 450 by way of a non-limiting 270 milliseconds after $T_{0,master}$ 410, the master performs a fourth calculation of $T_\Delta$, and sends the value of $T_{4,\Delta}$ to the slave. The slave receives $T_{4,\Delta}$ some time later than it was sent, the difference in time being a fourth Network Delay (ND) 452. When the slave receives the $T_{4,\Delta}$, the slave calculates a fourth approximation of $T_{0,slave}$ by subtracting $T_{4,\Delta}$ from the slave local time $T_{4,slave}$ 453. In case of the example depicted in FIG. 4, the fourth Network Delay (ND) 452 is larger than the third Network Delay (ND) 442, therefore the fourth approximation of $T_{0,slave}$ (not shown) is not prior to the third approximation of $T_{0,slave}$ 444, and the third approximation of $T_{0,slave}$ 444 is not replaced.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for synchronizing at least two nodes on a network comprising:
    one network node acting as a master node, the master node:
        setting a base time $T_{0,master}$; and
        sending elapsed time since $T_{0,master}$ to at least one other node acting as a slave node; and
    the at least one other node acting as the slave node:
        receiving the elapsed time; and
        estimating and setting a value of a base time $T_{0,slave}$ based, at least partly, on the received elapsed time, and
    wherein the following is performed iteratively:
        the master node sending a new elapsed time since the $T_{0,master}$;
        the slave node receiving the new elapsed time;
        the slave node producing a new estimate for each received new elapsed time; and
        the slave node updating the value of the base time $T_{0,slave}$ if the new estimate is prior to the base time $T_{0,slave}$ which is already set, and not updating the value of the base time $T_{0,slave}$ if the new estimate is not prior to the base time $T_{0,slave}$.

2. The method of claim 1 and wherein the estimating is performed by subtracting the received elapsed time and a predetermined system latency from a local clock time.

3. The method of claim 1 and wherein the sending elapsed time is performed more than once, and the slave node performs the receiving and the estimating more than once, and the slave node performs the setting a value of a base time $T_{0,slave}$ if the estimate provides better synchronization with the master node.

4. The method of claim 1 and wherein the nodes on the network comprise processes configured to communicate with each other.

5. The method of claim 1 and wherein the nodes on the network comprise devices configured to communicate with each other using Bluetooth communications.

6. The method of claim 1 and wherein after synchronization the base time $T_{0,master}$ and the base time $T_{0,slave}$ are within less than 1 millisecond of each other.

7. The method of claim 1 and wherein the slave node comprises a first slave node, and the first slave node performs synchronization and acts as the master node for a second slave node which is on a network with the first slave node.

8. The method of claim 1 and wherein setting the base time $T_{0,master}$ comprises calculating a statistical value of base times polled from more than one node, and setting the statistic value to be the base time $T_{0,master}$.

9. The method of claim 1 and wherein the statistical value is an average.

10. The method of claim 1 and wherein the master node sets more than one base time $T_{0,master}$, and sends the elapsed time per more than one of the base times $T_{0,master}$.

11. The method of claim 1 and wherein the network is a wireless network.

12. The method of claim 1 and wherein the network is a direct wireless network.

13. The method of claim 1 and wherein the network is a Bluetooth network.

14. The method of claim 2 and wherein the predetermined system latency comprises a measurement of network latency.

15. The method of claim 14 and wherein the predetermined system latency also comprises a measurement of time taken by the master node to calculate and send the elapsed time, and the time taken by the slave node to receive and calculate $T_{0,slave}$.

16. A method for a slave node to synchronize to a master node, comprising:
- receiving an elapsed time since a master base time $T_{0,master}$ sent by the master node; and
- estimating and setting a value of a base time $T_{0,slave}$ based, at least partly, on the received elapsed time, and wherein:
- the slave node receives more than one elapsed time;
- the slave node performs the receiving and the estimating for each received elapsed time; and
- the slave node updates the base time $T_{0,slave}$ whenever the estimating produces a base time prior to the $T_{0,slave}$ which is already set, and does not update the base time $T_{0,slave}$ whenever the estimating produces a base time not prior to the $T_{0,slave}$ which is already set.

17. The method of claim 16 and wherein the slave node receives more than one elapsed time since base time $T_{0,master}$, referencing more than one base time $T_{0,master}$, and sets more than one $T_{0,slave}$ corresponding to the more than one base times $T_{0,master}$.

18. The method of claim 16 and wherein the network is a wireless network.

19. The method of claim 16 and wherein the network is a direct wireless network.

20. The method of claim 16 and wherein the network is a Bluetooth network.

21. The method of claim 16 and wherein the estimating is performed by subtracting the received elapsed time and a predetermined system latency from a local clock time.

22. The method of claim 21 and wherein the predetermined system latency comprises a measurement of network latency.

23. The method of claim 22 and wherein the predetermined system latency also comprises a measurement of time taken by the master node to calculate and send the elapsed time, and the time taken by the slave node to receive and calculate $T_{0,slave}$.

24. A method for synchronizing at least two nodes on a network, comprising:
- one network node, acting as a master node, sending synchronization data, based at least in part on its local clock, to at least one other node acting as a slave node;
- the at least one other node, acting as a slave node, receiving the synchronization data, and synchronizing with the master node, based, at least in part, on its local clock and the synchronization data; and
- the master node repeating the sending and the slave node repeating the receiving and synchronizing, and
- wherein the following is performed iteratively:
  - the master node sending said synchronization data;
  - the slave node receiving said synchronization data;
  - the slave node synchronizing with the master node if its local clock is prior to the local clock base time which is already set, and not synchronizing with the master node if the local clock base time is not prior to the local clock base time which is already set.

25. The method according to claim 24 and wherein the number of repetitions is greater than 2.

26. The method according to claim 24 and wherein the master node repeats the sending and the slave node repeats the receiving and synchronizing until the slave node determines that a statistic of last N improvements in synchronization accuracy are less than a predetermined value.

27. The method of claim 24 and wherein the slave node is synchronized to the master node to within one millisecond.

28. The method of claim 24 and wherein the slave node also sends synchronization data to the master node, and the master node determines when the master node and the slave node are synchronized to within less than a predetermined value, based, at least in part, on the synchronization data sent by the slave to the master.

29. The method of claim 24 and wherein the network is a wireless network.

30. The method of claim 24 and wherein the network is a direct wireless network.

31. The method of claim 24 and wherein the network is a Bluetooth network.

* * * * *